United States Patent [19]

Gogel

[11] 4,156,026

[45] May 22, 1979

[54] ION EXCHANGE TREATMENT OF GRAPE WINES

[75] Inventor: Edward V. Gogel, Downers Grove, Ill.

[73] Assignee: Mogen David Wine Corporation, Chicago, Ill.

[21] Appl. No.: 927,638

[22] Filed: Jul. 24, 1978

[51] Int. Cl.² ............................................. C12H 1/04
[52] U.S. Cl. .................................. 426/271; 426/15; 426/592
[58] Field of Search ................. 426/15, 271, 592, 599; 210/37 R, 38 R, 74

[56] References Cited

U.S. PATENT DOCUMENTS

| | | | |
|---|---|---|---|
| 2,667,417 | 1/1954 | Delmousée et al. | 426/271 |
| 2,682,468 | 6/1954 | Frampton | 426/271 |
| 2,754,212 | 7/1956 | Wiseman | 426/271 |
| 3,437,491 | 4/1969 | Peterson et al. | 426/271 |

FOREIGN PATENT DOCUMENTS

528402  7/1956  Canada ..................................... 426/271

Primary Examiner—Arthur L. Corbin
Attorney, Agent, or Firm—Wallenstein, Spangenberg, Hattis & Strampel

[57] ABSTRACT

Wines, particularly those which are prepared from grapes which have a very strong foxy or wild characteristic, such as those of the *Vitis labrusca* species or variety, are improved as to their taste characteristics and stability. This is accomplished by contacting one given portion of a wine with a weak basic ion exchange material or resin, contacting another given portion of said wine with a strong acid cation exchange material or resin, and then blending certain proportions of each of said aforesaid treated wines alone or with a given portion of the original untreated wine or with a different original untreated wine of similar character to that of the original wine.

12 Claims, No Drawings

ION EXCHANGE TREATMENT OF GRAPE WINES

This invention relates to a process for the treatment of wines, particularly those wines which are prepared from grapes which have a very strong foxy or wild characteristic, such as those of the *Vitis labrusca* species or variety, whereby to improve their taste characteristics and stability. This is accomplished by contacting one given portion of a wine with a weak basic ion exchange material or resin, contacting another given portion of said wine with a strong acid cation exchange material or resin, and then blending certain proportions of each of said aforesaid treated wines with a given portion of the original untreated wine or with a different original untreated wine of similar character to that of the original wine. In the broader aspects of the invention, less desirable, however, the wine blend may be that of the mixture of the two separately ion exchanged wines but without blending the same with the untreated wine.

BACKGROUND OF THE INVENTION

Problems relative to wine properties and characteristics such as flavor, color, aroma and stability under standing or storage conditions have involved wines generally, and numerous procedures, such as those referred to hereinbelow, have been suggested in efforts to overcome such problems. The varieties of particular grapes and the areas where they are grown commonly bear substantially on particular problems in relation to the wines which are produced from such grapes. Thus, by way of illustration, the wine industry in the eastern part of the United States has had particular difficulty with the strong characteristics of its wines since the grapes from which these are made, commonly those of the *Vitis labrusca* species or variety, have a strong foxy or wild characteristic. Many efforts have heretofore been made to ascertain whether, through different wine-making practices or grape growing or by various treatment procedures, this characteristic can be eliminated or at least reduced to a point where the wines would have improved taste and stability characteristics such as, for instance, are present in *Vitis vinifera* type wines.

Furthermore, with the advent of shortages of power, the stabilization of such eastern United States wines by conventional or usual procedures, namely, by reducing the temperature of the wines by means of cooling through a heat exchanger to approximately 22° F. and maintaining them at that temperature until the wines are essentially totally stabilized, has created substantial costs for various wine producers.

One particular, although illustrative, procedure for effecting stabilization which has been used involves the cation exchange of wines using sodium chloride as the regenerate for the cation exchange resins employed. This increases the sodium content of the wine substantially since the potassium ions are replaced with sodium ions, and, since sodium bi-tartrate is soluble in an alcoholic solution, the wine then is considered to be stabilized. In other words, the potassium bi-tartrate content of the wines is reduced to the point that no precipitation will take place during consumer storage or refrigeration.

DESCRIPTION OF PRIOR ART

It has heretofore been known to the art, as disclosed in U.S. Pat. No. 2,667,417, to treat wines, particularly young wines, to purify, clarify and stabilize them by a process which comprises passing the wine sequentially initially through a synthetic cation exchange resin such as, for instance, an after-sulfonated polystyrene cross-linked with up to 10% divinyl benzene, and then through a synthetic anion exchange resin such as, for instance, a ternary alkyl ammonium polystyrene, whereby a selected portion of the undesirable constituents of the wine may be eliminated, without interfering unduly with the presence of necessary or useful constituents which condition the flavor.

It has also been known to the art, as shown in U.S. Pat. No. 2,682,468, to treat wines containing an excess of volatile acidity to effect a reduction of said acidity by a procedure comprising contacting such wines sequentially with a cation exchange resin of the hydrogen exchange type, especially that sold under the trademark "Amberlite IR 120" (which is a strong cation exchange resin), pretreated with an acid, and then contacting said cation-exchanged wine with an anion exchange resin of the hydroxyl exchange type, such as that sold under the trademark "Amberlite IR 4B", pretreated with an acid and then with an alkaline material. The resulting ion exchanged wine is then blended with an equal volume of the original untreated or non-ion exchange wine.

U.S. Pat. No. 2,754,212 refers, among other procedures for treating wines, to prior disclosed two-stage processes for treating wines by sequentially contacting the wines initially with a cation exchange material to remove potassium and other obnoxious metals, and then with an ion exchange material to remove tartrate ions. Such prior known procedures are stated to suffer from complications, which said patent explains, in regard to adverse effects on flavor and the character of the wines and their acidities.

U.S. Pat. No. 3,437,491 deals with a two-stage process of treating wines to effect improvements in such characteristics of the wines as flavor, aroma and color, in which, in the first step, the wines are contacted with a weak anion exchange material or resin, and then such anion-exchanged wines are contacted with a cation, particularly a strong cation, exchange material or resin. This procedure reverses the order of the sequential steps of prior two-stage ion exchange material or resin treatments such as those disclosed or referred to in the aforementioned U.S. Pat. Nos. 2,667,417; 2,682,468 and 2,754,212. U.S. Pat. No. 3,437,491 also points out the objectionable and disadvantageous aspects of prior known two-stage sequential processes of treating wines in which, in the first step, a cation exchange material or resin is used, and the resulting cation-exchanged wines, in the second step, are subjected to contact with an anion exchange material or resin.

Other procedures are known to the prior art for treating wines with ion exchange materials or resins or by electrodialysis but such other prior known procedures, to the best of my knowledge and belief, are even further removed, as to their relevancy, from the patents specifically identified above in relation to the present invention which is described in detail hereafter.

BRIEF SUMMARY OF THE INVENTION

Wines, particularly of the type which have a strong foxy or wild characteristic, exemplified particularly by those made from grapes of the *Vitis labrusca* species or variety, are treated by a procedure which has been found to be effective to improve the flavor characteristics of said wines so that they are widely accepted by the wine consuming populace, and to stabilize said wines thereby resulting in savings in energy and dollars to wine producers. The foregoing improvements are achieved in accordance with the present invention by relatively simple procedures without any increase or without any substantial or objectionable increase in the mineral content of the final wines.

The procedural steps of the process of the present invention, briefly stated, comprise contacting a portion of the starting wine with a weak basic anion exchange material or resin after regeneration to the hydroxyl ($OH^-$) form; contacting another portion of the starting wine with a strong acid cation exchange material or resin after regeneration to the hydrogen ($H^+$) form. Thereafter the thus treated portions of the starting wine are blended, in selected proportions, with a selected proportion of the original or starting non-ion resin exchanged wine. While the blending of the treated portions is most advantageously effected with the same starting wine, one may carry out the blending using a different starting wine of similar character to that of original starting wine.

DETAILED DESCRIPTION AND PREFERRED EMBODIMENTS AND EXAMPLES

Ion exchange materials or resins which can be used in the practice of the present invention are well known per se as commercial materials, and they are offered for sale by various companies under various trademarks or trade designations. Illustrative weak basic anion exchange resins and illustrative strong acid cation exchange resins are disclosed in the aforementioned U.S. Pat. No. 3,437,491, all disclosures with respect to which are incorporated herein by reference. The present invention will be described wherein the weak basic anion exchange resin which is utilized is that sold under the trademark "Duolite A-7D", and wherein the strong acid cation exchange resin is that sold under the trademark "Duolite C-25 D" (Diamond Shamrock Corporation), which are very satisfactory for use in the practice of the present invention. Other ion exchange resins falling into the aforesaid categories can, of course, be employed.

Before use of the ion exchange resins in the practice of the present invention, they are regenerated in accordance with known practices. Thus, the weak basic anion exchange resin is regenerated with a basic regenerant of which sodium hydroxide and ammonium hydroxide are illustrative, sodium hydroxide being particularly preferred. The strong acid cation exchange resin is regenerated with a mineral acid or an organic acid, illustrative examples of which are sulfuric acid, hydrochloric acid, phosphoric acid, citric acid, fumaric acid and malic acid, the use of sulfuric acid being preferred. In both cases, after the ion exchanges resins have been regenerated they are rinsed with a substantial amount of water, particularly demineralized water, to remove excess regenerant and so that (a) in the case of the weak basic anion exchange resin, the pH of the effluent, from a column of said resin, is most desirably in the range between 3.8 and 4.8, and (b) in the case of the strong acid cation exchange resin, the pH of the effluent, from a column of said resin, is most desirably in the range between 2 and 3. If desired, to the extent that the regenerated resins contain excess water on the surfaces or in the pores of the particles thereof, such may be removed in well known manners.

The ion exchange resins are most desirably utilized, in the form of columns of known kinds, using up-flow or down-flow, the latter being preferable. However, less desirably from a handling standpoint, any procedures of effecting adequate contacting of separate portions of the wine, one portion with the weak basic anion exchange resin and the other portion with the strong acid cation exchange resin, can be utilized.

Generally speaking, the wines which are most desirably treated in accordance with the present invention have a pH in the range of 3 to 4, and it is desirable that the stabilization be made effective at a desired pH within said range. Treatment of the original or starting wine by contacting it with the weak basic anion exchange resin effects removal of a substantial amount of tartrates, which aids in the stabilization of the wine. In addition, substances, the nature of which has not been determined, which are responsible for undesirable flavors or off-flavors of the wine, are adsorbed by the weak basic anion exchange resin. The effect of said treatment on the content of potassium in the original or starting wine is relatively small; and the effect of the treatment on the sodium and calcium content of the original or starting wine is not particularly appreciable. The effect of said treatment on the titrable acidity of the original or starting wine is, generally, to decrease it substantially. The effect on pH is to increase it.

Treatment of the original or starting wine by contacting it with the strong acid cation exchange resin results in increasing the titratable acidity of the wine, in substantially lowering the pH of the wine, leaves essentially unaffected, or reduces only relatively slightly, the tartaric acid content of the wine, and very substantially reduces the content of potassium. As to the sodium and calcium contents, in certain cases the sodium content is appreciably decreased and in other cases it is slightly increased; and, in the case of calcium, there is generally a lowering thereof, in certain instances of substantial magnitude, and, in other instances, of relatively small magnitude.

The stability of wine is determined by what is generally known as a Concentration Product which is controlled by three factors: pH, potassium concentration and tartrate concentration. In accordance with the present invention, the desired Concentration Product whereby a stable wine is obtained is effectively and economically achieved. The extent of the treatment steps and the amounts of the treated portions of the wine and the untreated wine which are blended together are determined by the particular nature and composition of the original or starting untreated wine.

The present invention is distinguished from those heretofore known sequential processes in which a given wine is initially contacted with an acid or strong acid cation exchange resin and then said thus treated wine is contacted with a basic or weak basic ion exchange resin, or contacted in the reverse order of said cation and anion exchange resins. No such sequential treatment of the wines is involved but, on the contrary, separate portions of a starting non-ion exchanged wine are separately subjected, respectively, to contact with a weak basic ion exchange material or resin and to contact with a strong acid cation exchange material or resin, and then a mixture of portions of each of said separately treated wines is blended with a portion of the original non-ion exchanged starting wine or with a different original non-ion exchanged wine of a character similar to the first original or starting wine. The improvements which are obtainable and which are obtained by the present process are not achieved by the heretofore known two-stage sequential treatment procedures which have been referred to above, particularly in dealing with the problem of improvements in taste characteristics and stability of those wines which are prepared from grapes having strong foxy or wild characteristics, such as those of the *Vitis labrusca* species.

The wines which are treated in accordance with the present invention are prepared in any conventional manner as, for instance, crushing the grapes, removal of stems, addition of sulfur dioxide and yeast to the must, removal of solids from the must by settling, separation of the juice, fermentation thereof, settling and filtering.

The following examples are illustrative of the practice of the present invention and are to be understood not as limitative thereof. Thus, for instance, different wines can be utilized, different weak basic anion exchange and different strong acid cation exchange materials or resins can be employed, the regeneration procedures for the anion and cation exchange resins can be modified, and other changes can be made in light of the principles and disclosures made hereinabove. The abbreviations set out in the Examples, to the extent that their meaning may not be entirely apparent, mean the following: ALC is the alcohol content by volume; TA is titratable acidity; TAR is tartaric; and IX refers to the ion exchange resin.

EXAMPLE I

The wine used in this illustration was a 20% concord type wine prepared from grapes of the *Vitis labrusca* species and having a strong foxy or wild characteristic. In this case, two 6 cubic feet ion exchange columns were packed; one with 6 cubic feet of the "Duolite C-25 D" resin and the other with 6 cubic feet of the "Duolite A-7 D" resin. These were regenerated in the following manner: the "Duolite C-25 D" resin with 5 bed volumes of 5% aqueous sulfuric acid, and the "Duolite A-7 D" resin with 5 bed volumes of 5% aqueous sodium hydroxide. Each column was then rinsed with approximately 10 bed volumes of deionized water. The "Duolite A-7 D" column was further rinsed with a weak aqueous solution of citric acid to condition the column for the acceptance of the wine. The volume passed through the "Duolite C-25 D" column was 2,300 gallons of wine before exhaustion, and the volume passed through the "Duolite A-7 D" column was 700 gallons before exhaustion. The following is a chemical analysis of the wines:

|  | Chemical Analysis | | | | | | | |
|---|---|---|---|---|---|---|---|---|
|  | ALC | $SO_2$ | TA | pH | TAR ACID | K | Na | Ca |
| Before IX | 20.2% | 164ppm | 0.58ppm | 3.6 | 1550ppm | 680ppm | 50ppm | 89ppm |
| Cation IX | 19.5% | 148ppm | 0.66ppm | 2.3 | 1550ppm | 100ppm | 20ppm | 3ppm |
| Anion IX | 19.7% | 100ppm | 0.30ppm | 3.9 | 350ppm | 700ppm | 50ppm | 81ppm |

Blend

In the blending process, ⅓ of the cation resin exchanged wine was blended with ⅓ of the anion resin exchanged wine, and ⅓ of the non-ion exchanged wine. The analysis of the resulting blend was as follows:

| ALC | $SO_2$ | TA | pH | TAR ACID | K | Na | Ca |
|---|---|---|---|---|---|---|---|
| 19.6% | 120 ppm | 0.52 ppm | 3.3 | 1100ppm | 520ppm | 30ppm | 50ppm |

A second blend was made using 50% of the cation resin exchanged wine and 50% of the anion exchanged wine. The following analysis of the resulting blend was as follows:

| ALC | $SO_2$ | TA | pH | TAR ACID | K | Na | Ca |
|---|---|---|---|---|---|---|---|
| 19.4% | 130 ppm | 0.45 ppm | 3.1 | 850ppm | 400ppm | 40ppm | 35ppm |

In the case of both of said blended wines of this Example I, they were stable in all regards. The blended wines were compared with the original or untreated wine in taste panel tests by skilled wine tasters and the blended wines were found to be distinctly superior in relation to their taste and flavor characteristics to those of the original or untreated wine.

EXAMPLE II

The anion and cation exchange resin columns were regenerated and treated in the same way as in Example I. The starting wine used in this case was a 12% concord type wine made from grapes having a somewhat strong or wild characteristic taste. The total amount of wine processed through this system was 2,500 gallons. Through the strong acid cation exchange resin was fed 2,000 gallons of the starting wine, and through the weak basic anion exchange resin 500 gallons of the starting wine. The following is a chemical analysis of the wines:

|  | Chemical Analysis | | | | | | | |
|---|---|---|---|---|---|---|---|---|
|  | ALC | $SO_2$ | TA | pH | TAR ACID | K | Na | Ca |
| Before IX | 11.3% | 164ppm | 0.73ppm | 3.25 | 2625ppm | 650ppm | 40ppm | 62ppm |
| Cation IX | 11.1% | 142ppm | 0.80ppm | 2.10 | 2500ppm | 40ppm | 0ppm | 10ppm |
| Anion IX | 11.2% | 87ppm | 0.43ppm | 3.90 | 700ppm | 660ppm | 60ppm | 56ppm |

Blend

In the blending process ⅓ of the cation resin exchanged wine was blended with ⅓ of the anion resin exchanged wine, and ⅓ of the non-ion exchanged wine. The analysis of the resulting blend was as follows:

| ALC | SO$_2$ | TA | pH | TAR ACID | K | Na | Ca |
|---|---|---|---|---|---|---|---|
| 11.1% | 120 ppm | 0.65 | 3.1 | 1900 ppm | 450ppm | 60ppm | 43ppm |

A second blend was made using 50% of the cation resin exchanged wine and 50% of the anion exchanged wine. The following analysis of the resulting blend was as follows:

| ALC | SO$_2$ | TA | pH | TAR ACID | K | Na | Ca |
|---|---|---|---|---|---|---|---|
| 11.1% | 120 ppm | 0.58 | 3.0 | 1500 ppm | 350ppm | 30ppm | 40ppm |

In the cases of both of said blended wines of this Example II, they were stable in all regards. The blended wines were compared with the original or untreated wine in taste panel tests by skilled wine tasters and the blended wines were found to be distinctly superior in relation to their taste and flavor characteristics to those of the original or untreated wine.

In the wines produced in accordance with the process of the present invention, there is generally a slight color reduction due to the absorption of some color components on the weak basic anion exchange resin column. This is of a minor character and is of no material significance in relation to the significant improvements which are brought about by the present invention.

It may be noted that the relative amounts of the anion resin exchanged wine and of the cation resin exchanged wine which are blended together, and particularly blended together with the original or similar untreated wine are quite variable. Generally, it is preferred to blend together approximately equal volumes of the two wines resulting from the above described separate ion exchange treatments. However, one may blend together said treated wines in proportions in the range of about 60–40 to 40–60 parts by volume or a reasonable variation thereof. When the two portions of the separately treated wine are blended with the untreated wine which, as noted above, represents the particularly important and most advantageous aspect or embodiment of the present invention, the relative proportion of the untreated wine generally will represent from about 30% to 50% of the final blend with the balance representing approximately equal proportions of the separately treated ion-exchanged wines.

In the arrangement of the ion exchange columns which are advantageously used in the practice of the present invention, it is desirable, for proper balance, that the anion exchange resin column be approximately three times larger in volume than the cation exchange resin column and it may even be as much as about four times as large. This is because from about three to about four times as much wine can be passed through the cation exchange resin column than can be passed through the anion exchange resin column in the same period of time before exhaustion of said two columns occurs.

Wherever the term "wine" or "wines" is used above and in the claims, it will be understood to mean wine derived from grapes.

I claim:

1. A process for the treatment of wines which comprises contacting a portion of a given previously non-ion resin exchanged wine with a weak basic anion exchange material, contacting another portion of said given wine with a strong acid cation exchange material, and then blending the two resulting ion exchanged wines in proportions to produce a blended wine which is stabilized and is further characterized by improved flavor and taste characteristics in relation to said previously non-ion resin exchanged wine.

2. A process according to claim 1, in which the wine comprises mainly that which is prepared from grapes of the *Vitis labrusca* species.

3. A process according to claims 1 or 2, in which said anion exchange material is an ion exchange resin in essentially the OH$^-$ form, and in which said cation exchange material is an ion exchange resin in essentially the H$^+$ form.

4. A process for the treatment of wines which comprises contacting a portion of a given previously non-ion resin exchanged wine with a weak basic anion exchange material, contacting another portion of said given wine with a strong acid cation exchange material, and then blending the two resulting ion exchanged wines with a portion of the given previously non-ion resin exchanged wine or with a different previously non-ion resin exchanged wine of a character similar to that of the first-mentioned given wine to produce a blended wine which is stabilized and is further characterized by improved flavor and taste characteristics in relation to said previously non-ion resin exchanged wine.

5. A process according to claim 4, in which the previously non-ion resin exchanged wine has a strong foxy or wild characteristic.

6. A process according to claim 4, in which the proportions of the wines which are blended are approximately equal parts of said anion resin exchanged wine, said cation resin exchanged wine, and said untreated wine.

7. A process according to claim 4, wherein the ion exchange resins are in the form of separate columns for each of said anion exchange resin and said cation exchange resin, and wherein the volume of said anion exchange resin is from about three to four times the volume of said cation exchange resin.

8. A process according to claim 4, in which the wine comprises mainly that which is prepared from grapes of the *Vitis labrusca* species.

9. A process according to claim 4, in which said anion exchange material is an ion exchange resin in essentially the OH$^-$ form, and in which said cation exchange material is an ion exchange resin in essentially the H$^+$ form.

10. A process for the treatment of wine, prepared from grapes of the *Vitis labrusca* species and possessing a strong foxy or wild characteristic, to produce a stabilized wine which also possesses improved flavor and taste characteristics which comprises contacting a portion of the wine with a weak basic anion exchange resin in the OH$^-$ form, contacting another portion of said wine with a strong acid cation exchange resin in the H$^+$ form, and then blending the two resulting ion exchanged wines with a portion of the untreated wine.

11. A process according to claim 10, in which the proportions of the wines which are blended are approximately equal parts of said anion resin exchanged wine, said cation resin exchanged wine, and said untreated wine.

12. A process according to claim 10, wherein the ion exchange resins are in the form of separate columns for each of said anion exchange resin and said cation exchange resin, and wherein the volume of said anion exchange resin is from about three to four times the volume of said cation exchange resin.

* * * * *